United States Patent
Braden et al.

(10) Patent No.: US 9,505,200 B2
(45) Date of Patent: Nov. 29, 2016

(54) METHOD OF MANUFACTURING SEPTUM CAP

(71) Applicant: ROHR, INC., Chula Vista, CA (US)

(72) Inventors: Robert L. Braden, Chula Vista, CA (US); Ian F. Winfield, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 295 days.

(21) Appl. No.: 14/251,346

(22) Filed: Apr. 11, 2014

(65) Prior Publication Data

US 2015/0290920 A1    Oct. 15, 2015

(51) Int. Cl.
*B32B 37/14*    (2006.01)
*B29D 99/00*    (2010.01)
*B32B 37/18*    (2006.01)

(52) U.S. Cl.
CPC ......... *B32B 37/146* (2013.01); *B29D 99/0089* (2013.01); *B32B 37/18* (2013.01); *B32B 2307/102* (2013.01); *B32B 2605/18* (2013.01); *Y10T 156/1003* (2015.01)

(58) Field of Classification Search
None
See application file for complete search history.

(56) References Cited

U.S. PATENT DOCUMENTS

| | | | | |
|---|---|---|---|---|
| 3,520,763 A | * | 7/1970 | Holland | B31D 3/0292 156/197 |
| 3,713,954 A | * | 1/1973 | Clark | B31D 3/0223 156/197 |
| 4,118,263 A | * | 10/1978 | Cook, Jr. | B29C 65/5071 156/197 |
| 7,854,298 B2 | | 12/2010 | Ayle | |
| 8,066,098 B2 | | 11/2011 | Ayle | |
| 2011/0073407 A1 | | 3/2011 | Ayle | |
| 2012/0037449 A1 | | 2/2012 | Ayle | |
| 2013/0062143 A1 | | 3/2013 | Ichihashi | |

* cited by examiner

*Primary Examiner* — Barbara J Musser
(74) *Attorney, Agent, or Firm* — Snell & Wilmer, L.L.P.

(57) ABSTRACT

A method of manufacturing an acoustic structure is disclosed. An adhesive material and a septum forming material may be deposited on a first honeycomb ribbon. A second honeycomb ribbon may be adhered to the adhesive material and the septum forming material. The first honeycomb ribbon and the second honeycomb ribbon may be expanded to form a honeycomb structure. The septum forming material may stretch or expand to form a septum cap in a cell of the honeycomb structure. The septum forming material may be inherently porous, and/or the septum cap may be cured in order to introduce pores into the septum cap.

13 Claims, 5 Drawing Sheets

METHOD OF MANUFACTURING SEPTUM CAP

FIELD

The present disclosure relates to the attenuation of sound waves, and more particularly, to methods of manufacturing septum caps.

BACKGROUND

One method of dealing with excess noise generated by a specific source is to treat the noise at the source. This is typically accomplished by adding acoustic damping structures (acoustic treatments) to the structure surrounding noise source. One particularly problematic noise source is the jet engines used on most passenger aircraft.

Open cell honeycomb core is a popular material for use in aircraft and aerospace vehicles because it is relatively strong and lightweight. For acoustic applications, a goal has been to incorporate acoustic material into the honeycomb structure. For instance, historically, acoustic material has been inserted into the honeycomb cells. In historical cases where expandable honeycomb core has been used, the acoustic material has been inserted into the honeycomb cells post-expansion. In historical cases where corrugated honeycomb core has been used, the acoustic material has been inserted into the honeycomb cells post bonding or welding of the stack. In both aforementioned cases, the acoustic material may be individually inserted into each honeycomb cell and may remain in place by friction locking or by applying an adhesive to the acoustic material.

SUMMARY

A method of manufacturing an acoustic structure is disclosed. The method may comprise applying an adhesive to a first honeycomb ribbon. A septum forming material may be applied to the first honey comb ribbon. A second honeycomb ribbon may be adhered to the adhesive and the septum forming material. The first honeycomb ribbon and the second honeycomb ribbon may be expanded into a honeycomb structure.

A method of manufacturing an acoustic septum is disclosed. The method may comprise adhering a first substrate to a second substrate with a septum forming material. The method may comprise separating the first substrate from the second substrate, wherein the septum forming material stretches to form an acoustic septum between the first substrate and the second substrate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

According to various embodiments, aspects of the present disclosure may relate to a method of manufacturing a honeycomb structure including a septum cap. The honeycomb structure may be utilized to decrease noise emitted from a source, such as a gas turbine engine. An adhesive material and a septum forming material may be deposited on a plurality of honeycomb ribbons. The ribbons may be stacked together and expanded to create the honeycomb structure. Adjacent ribbons may adhere to each other in locations containing the adhesive material. The septum forming material may expand or stretch in order to create septum caps in cells in the honeycomb structure. As such, the honeycomb cell structure and the acoustic septum caps may be expanded concurrently.

Figure 1:
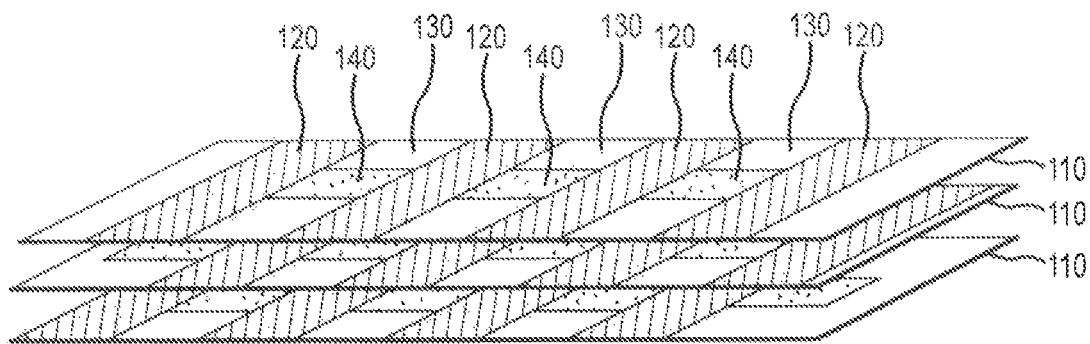
FIG. 1 illustrates a plurality of honeycomb ribbons in accordance with various embodiments of the disclosure.

Referring to FIG. 1, a plurality of honeycomb ribbons 110 are illustrated according to various embodiments. A honeycomb ribbon 110 may comprise a strip of material which is configured to be expanded into a honeycomb structure comprising honeycomb cells. In various embodiments, a honeycomb ribbon 110 may be a portion of a sheet of honeycomb ribbons 110, which may be cut into individual honeycomb ribbons 110. In various embodiments, the honeycomb ribbons 110 may comprise a lightweight material, such as aluminum. An adhesive material 120 may be deposited on the honeycomb ribbons 110. In various embodiments, the adhesive material 120 may be deposited in alternating strips, such that bare sections 130 of the honeycomb ribbons are located between alternating strips of adhesive material 120. The adhesive material 120 may correspond to sections of the honeycomb ribbons 110 that may adhere to adjacent honeycomb ribbons 110. The adhesive material 120 may prevent portions of adjacent honeycomb ribbons 110 from separating during expansion of the honeycomb ribbons 110 into a honeycomb structure.

A septum forming material 140 may be deposited on the bare sections 130 of the honeycomb ribbons 110. In various embodiments, the septum forming material 140 may cover any portion of the bare sections 130. For example, in various embodiments, the septum forming material 140 may be deposited on an area encompassing 10%-20% of the area of a bare section 130, or anywhere from less than 1% to 100% of the area of a bare section 130. The thickness and area of the septum forming material 140 may be tailored to achieve the final desired acoustic septum cap thickness after expansion. The thickness of the septum forming material 140 may be deposited with varying thickness to achieve the desired acoustic septum cap thickness after expansion. The area of deposited septum forming material 140 may correspond to a thickness of a resulting septum cap. In various embodiments, multiple discrete deposits of septum forming material 140 may be deposited in a single bare section 130 in order to form multiple septum caps in a single expanded honeycomb cell. In various embodiments, a plurality of rows of septum forming material 140 may be deposited in bare sections 130, and the plurality of honeycomb ribbons 110 may be cut between rows of septum forming material 140 in order to form multiple core sections from a single stack of honeycomb ribbons 110.

The septum forming material 140 may comprise an inherently porous material. Ceramic, metallic, or organic porous materials may be used to provide the desired properties such as adhesion, environmental stability, weatherability, pore sizing, and ease of processing. Additionally, nano particulate and/or nano scaled fibers may be used to provide smaller pore sizes and/or structural reinforcement, which in turn may allow for broadband noise mitigation when combined with septum caps made with other porous materials.

In various embodiments, the inherently porous material may be a foam material. Inherently porous material may describe that the pores are created within the material as the material is being initially formed. According to various embodiments, the septum forming material 140 may be inherently porous on a nano scale or a micro scale. The porosity and/or pore size may be a function of the formation of the material. Stated another way, the foam may be porous without introducing a secondary process to induce pores. However, in various embodiments a curing process may introduce or add pores to a septum forming material. The septum forming material 140 may be a nonwoven material, unlike a screen or mesh material. The septum forming material 140 may be a non-woven material, such as nano structured nonwoven material. Conditions of chemical treatments such as treatment time, chemical constituents and/or concentration can be used to tailor pore sizing and compatibility with the honeycomb structure. The chemical treatment process may include exposure to a temperature and pressure controlled environment. The septum forming material 140 may comprise a malleable material.

According to various embodiments, the septum forming material 140 may comprise an inherently adhesive foam. For instance, the septum forming material 140 may comprise an adhesive binder. Impregnation can be achieved via adhesive bath, spray coating, dip coating, or a combination thereof. According to various embodiments, a small amount of polymer binder (such as polyurethane) can be mixed with the material and a blowing agent and gas may be used to foam the mixture. Foaming can be achieved during pre-cure processing or as a result of the cure cycle. Cure variables such as heat, ramp rate, pressure, and cure time can be used to control the final porosity and/or pore size of the septum forming material 140. In various embodiments, the septum forming material 140 may comprise carbon nano fiber materials and/or nanotubes, such as carbon nanotubes. The processing flexibility of carbon nanotube and carbon nano fiber material allows for control of properties such as porosity, pore size, particle size, density/weight, and roughness (on a nano or micro scale). The pore geometry of high aspect ratio (where the length is greater than the width) nanotube and nanofiber material can be as high as 90% creating a foam with significant surface area. The septum forming material 140 treated with adhesive binder may be bonded onto a substrate such as the bare section 130 of the honeycomb ribbon 110. The adhesive rich septum forming material may be malleable and can stretch or expand to fill a cell as the honeycomb structure is expanded.

According to various embodiments, the manufacturing process may comprise a dispenser which may spray and/or dispense septum forming material 140 at a desired location on bare section 130. According to various embodiments, the septum forming material 140 may be held in place using adhesive or adhesive binder properties of the septum forming material 140. In various embodiments, a mechanical attachment may be used to secure the septum forming material 140 in position on bare section 130. For instance, the bare section 130 may be configured to receive the septum forming material 140, such as through flanges coupled to the bare section.

In various embodiments, the septum forming material 140 may be compressed between adjacent honeycomb ribbons 110. An elasticity of the septum forming material 140 may cause the septum forming material 140 to expand during expansion of the honeycomb structure to form a final acoustic septum.

Figure 2:
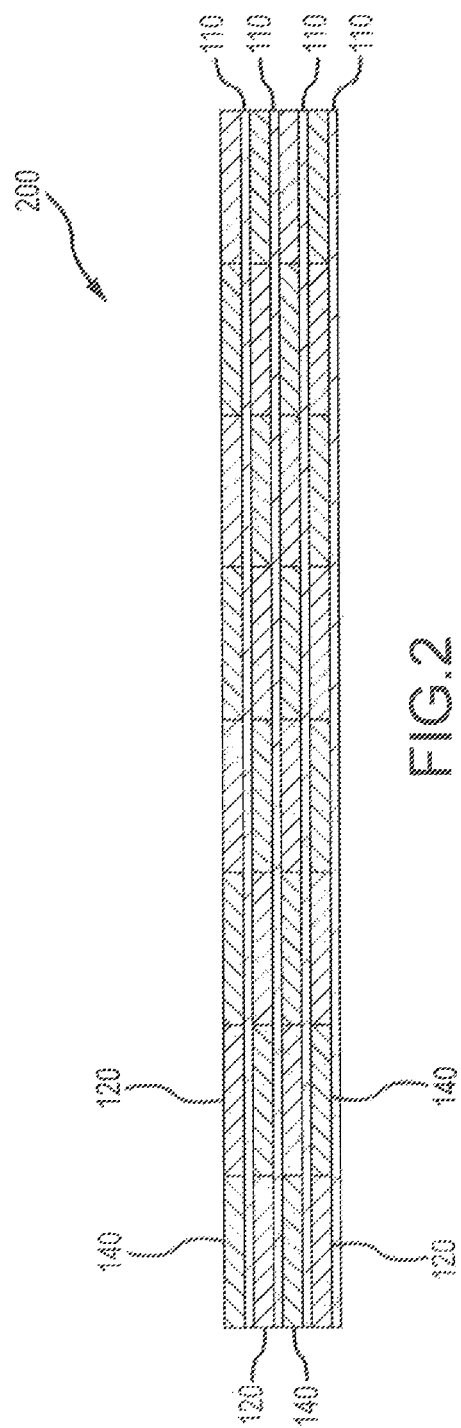
FIG. 2 illustrates a cross-section of a plurality of honeycomb ribbons in accordance with various embodiments.

Referring to FIG. 2, a cross-section 200 of a plurality of honeycomb ribbons 110 is illustrated according to varying embodiments. The honeycomb ribbons 110 may be positioned parallel to one another such that the adhesive material 120 and the septum forming material 140 contact adjacent honeycomb ribbons 110. The adhesive material 120 may adhere to adjacent honeycomb ribbons 110 and may prevent localized portions of adjacent honeycomb ribbons 110 from separating during expansion of the honeycomb structure. The septum forming material 140, however, may adhere to adjacent honeycomb ribbons 110, yet expand or stretch during expansion of the honeycomb structure. Thus, the septum forming material 140 may allow adjacent honeycomb ribbons 110 to separate to form a cell, while forming the septum forming material 140 into a septum cap within the cell.

Figure 3:
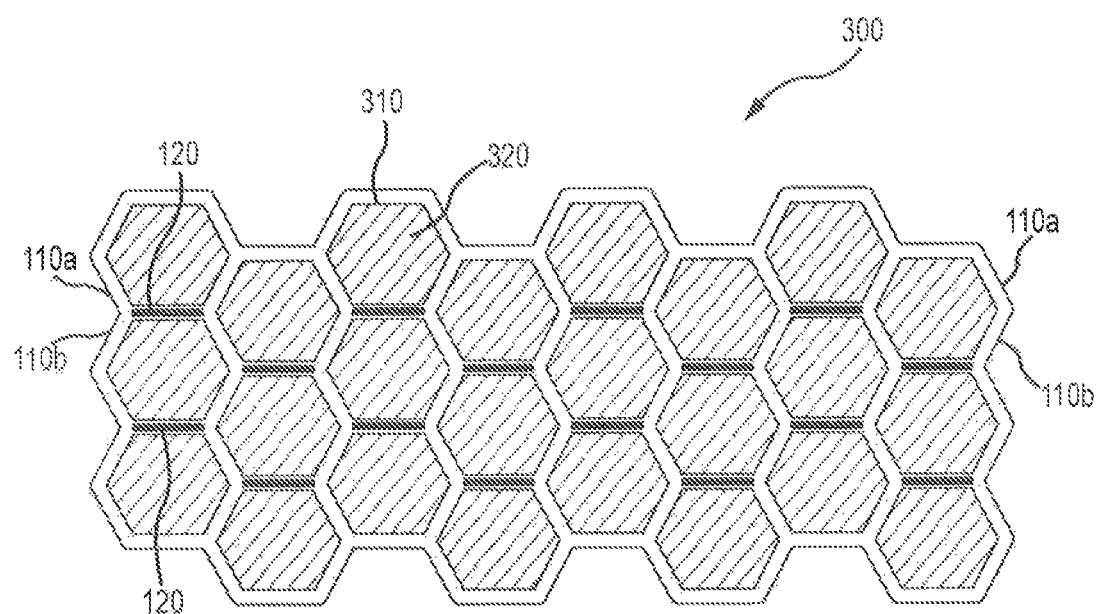
FIG. 3 illustrates a top view of an expanded honeycomb structure, in accordance with various embodiments.

Referring to FIG. 3, a top view of an expanded honeycomb structure 300 is illustrated according to various embodiments. The honeycomb structure 300 may comprise a plurality of cells 310. The cells 310 may be formed between honeycomb ribbons 110a. 110b which are coupled by adhesive material 120. One or more cells 310 may comprise a septum cap 320 formed by the septum forming material 140 described in FIGS. 1 and 2. The shape of each cell 310 of the plurality of cells 310 may be any shape, but for the sake of brevity, the cells 310 discussed herein may each comprise six sides and in the aggregate be referred to as the honeycomb structure 300 and/or honeycomb core.

In various embodiments, the septum cap 320 may undergo a curing process within the cell 310 after expansion of the honeycomb structure 300. The curing process may alter the properties of the septum cap 320. For example, in various embodiments the curing process may add porosity to the septum cap 320. The curing process may also stiffen and/or cause the septum cap 320 to expand. The curing process may also tailor existing porosity and/or pore size within the septum cap 320. Expansion of the septum cap 320 may assist in adhering the septum cap 320 within the cell via frictional forces.

Figure 4:
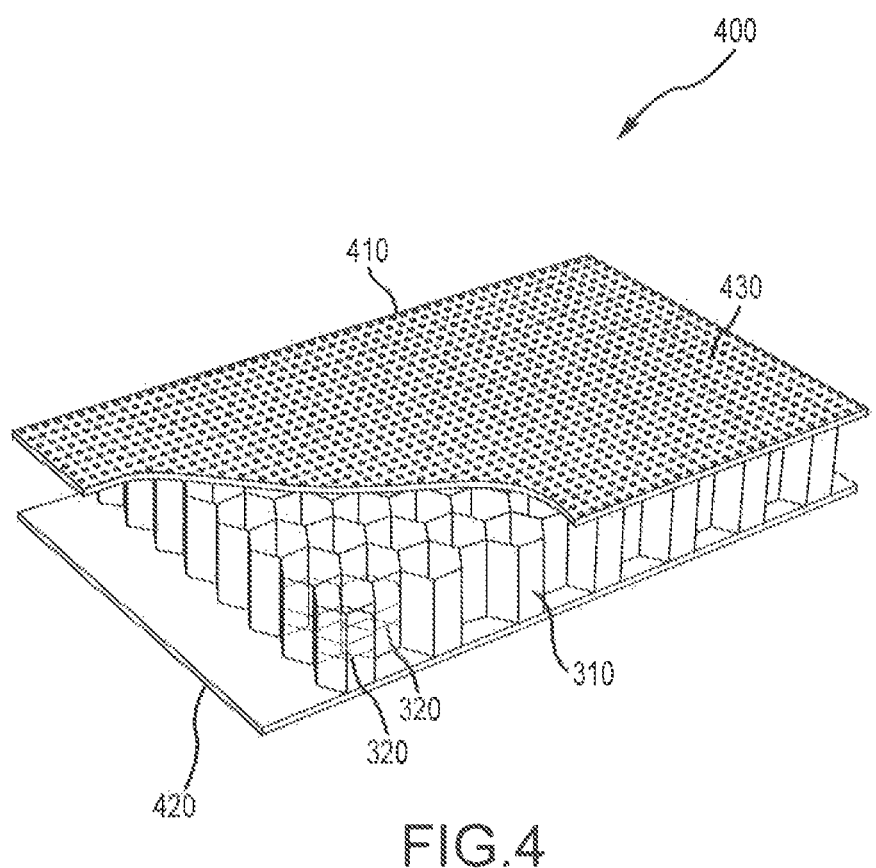
FIG. 4 illustrates a perspective view of a honeycomb structure, in accordance with various embodiments.

Referring to FIG. 4, a perspective view of a honeycomb structure 400 is illustrated according to various embodiments. The honeycomb structure 400 may comprise a plurality of cells 310, positioned between a perforated top sheet 410 and a back skin 420. The bottom of the honeycomb structure 400 may be closed by a generally rigid non-perforated plate referred to herein as the back skin 420. The back skin 420 may act as an acoustic reflector. A perforated top sheet 410 having perforations 430 may be coupled to the top of the honeycomb structure 400. Additional layers may be formed on top of the perforated top sheet 410 for airflow and/or acoustic properties as desired. The perforated top sheet 410, cell 310, and back skin 420 combine to form a chamber of the honeycomb cell 310 that becomes a resonating chamber and works to damp acoustic emissions, such as sound waves from an aircraft engine. Stated another way, one function of the honeycomb structure 400 may be to attenuate sound waves, such as high frequency sound waves (for example, in the frequency range varying from 4000 Hz to 5000 Hz).

In various embodiments, cells 310 of the honeycomb structure 400 may comprise a septum cap 320 located between the perforated top sheet 410 and the back skin 420 within the cell 310. The septum cap 320 may be located at any level between the perforated top sheet 410 and the back skin 420. The septum cap 320 may form a plane across and/or coupled to each interior wall to subdivide the cell 310 horizontally. The subdividing may not be equal. The location of the septum cap 320 within the chamber may be controlled by the location of the deposition of septum forming material 140 described with reference to FIG. 1. A chamber may be formed between the bottom of the septum cap 320 and the back skin 420. The septum cap 320 may be configured for acoustic purposes, such as attenuation of sound waves, diffraction of sound waves, and/or to form a torturous path for sound waves.

In various embodiments, more than one septum cap 320 may be formed within a cell 310. The septum caps 320 may be located at various heights within the cell 310 based on the length of the wavelength they are configured to reflect. Moreover, the septum caps 320 may comprise various thicknesses. The height within the cell 310 and/or thickness of the septum cap 320 may be tuned to address specific wavelengths of sound waves. The porosity and/or pore size of the various septum caps 320 within a cell 310 may be different from each other. Moreover, an acoustic wave may enter the cell 310 of the honeycomb core 400 and may interact with and reflect off various surfaces of the septum caps 320 which may result in additional reflection and/or vortex shedding. An acoustic wave exiting the cell 310 may be dissipated and/or cancelled based on its interactions with one or more layers of the septum caps 320. The septum caps 320 may be spaced apart within the cell 310 and/or be stacked within the cell 310 of the honeycomb core 400. A broad spectrum of many wavelengths may be treated via multiple layers of septum caps 320 in a cell 310 or a series of cells. For instance, different wavelengths may interact with different surfaces of the layers of septum caps 320. Thus a single cell 310 may be configured to address a plurality of acoustic waves entering the chamber.

Multiple layers of septum caps 320 may be stacked and in contact with each other by depositing septum forming material 140 in multiple locations on a bare section 130 in FIG. 1. Septum caps 320 may comprise different porosity, pore size, density/weight, roughness (on a nano or micro scale) and film/foam thickness. In this way, by stacking septum caps 320 of varying porosity, pore size, and/or thickness, a single acoustic treatment material may be formed that comprises varying porosity and/or pore size in the same/continuous thickness of material. In this way, the porous features of the composite porous septum cap (e.g., stacked layers of porous septum caps) may be tailored.

In operation, acoustic treatment structures are typically incorporated in the engine inlet, nacelle and exhaust structures. For instance, airflow surfaces over elements of an aircraft, such as airflow over perforated top sheet 410, may be perforated with thousands of perforations 430 typically in the range of about 1 mm/0.04 inch in diameter. Conventionally, the perforations 430 are configured to attenuate the jet engine's noise by damping the energy response, directing the sound into the cell 310 of the honeycomb core 400, rather than presenting a hard surface that simply reflects the sound. The cell 310 of the honeycomb core 400 may comprise one or more septum caps 320 configured for greater noise suppression and treatment of a wider range of attenuated frequencies. In various embodiments, the septum caps 320 may be configured to provide noise suppression within a specific range of attenuated frequencies. However, in various embodiments, the septum caps 320 may be configured to provide broadband noise suppression. As mentioned above, according to various embodiments, materials described herein may provide additive noise mitigation when combined with current legacy acoustic treatments.

Figure 5:
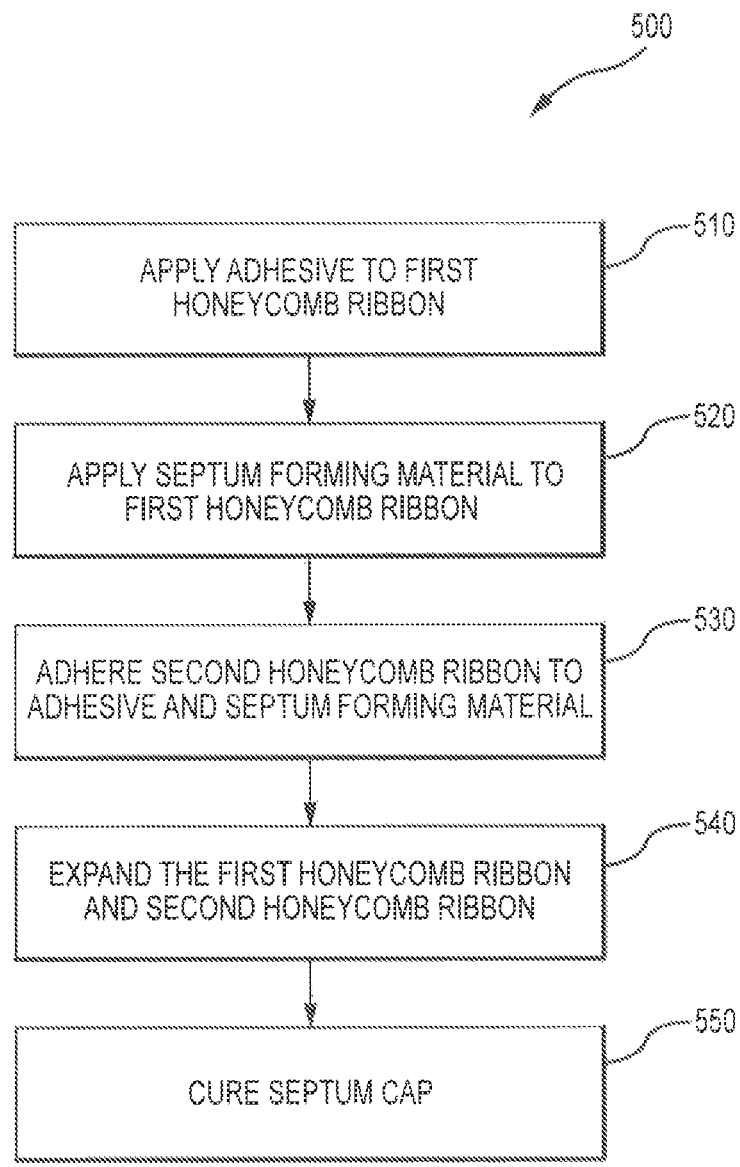
FIG. 5 illustrates a flowchart of a process for manufacturing an acoustic structure in accordance with various embodiments.

Referring to FIG. 5, a flowchart of a process 500 for manufacturing an acoustic structure is illustrated according to various embodiments. The process may include applying an adhesive to a first honeycomb ribbon (step 510). The adhesive may be configured to couple portions of two honeycomb ribbons together, such that the portions of the two honeycomb ribbons remain coupled together during expansion of the acoustic structure. The adhesive may be applied in sections separated by gaps, such that the first honeycomb ribbon comprises alternating sections of adhesive material and bare sections without the adhesive material.

The process may further comprise applying a septum forming material to the first honeycomb ribbon (step 520). In various embodiments, the septum forming material may be applied in the bare sections between the adhesive material. The septum forming material may be flexible and configured to form a septum cap in a cell during expansion of the acoustic structure. In various embodiments, the septum forming material may be deposited in multiple locations within a single bare section, such that multiple septum caps may be formed within a single cell. Furthermore, different septum forming materials may be used for septum forming material corresponding to different septum caps, such that an expanded acoustic structure may comprise septum caps of differing acoustic properties.

The process may further comprise adhering a second honeycomb ribbon to the adhesive and the septum forming material (step 530). The second honeycomb ribbon may be coupled to the adhesive and the septum forming material such that the adhesive and the septum forming material are located between the first honeycomb ribbon and the second honeycomb ribbon. In various embodiments, the second honeycomb ribbon may compress the septum forming material between the first honeycomb ribbon and the second honeycomb ribbon. The septum forming material may decompress during expansion of the acoustic structure in order to assist in forming a septum cap. In various embodiments, after the second honeycomb ribbon is adhered to the adhesive and the septum forming material, adhesive and septum forming material may be deposited on the second honeycomb ribbon. Multiple layers of honeycomb ribbon with the adhesive and septum forming material disposed thereon may thus be formed until the desired number of layers is reached. However, in various embodiments adhesive and septum forming material may be deposited on multiple honeycomb ribbons prior to stacking the honeycomb ribbons together.

In various embodiments, the honeycomb ribbons may be cured prior to expansion. Temperature and/or pressure may be applied to the honeycomb ribbons. The curing may control the porosity, pore size, flexibility, and/or other properties of the septum material following expansion of the honeycomb ribbons into a honeycomb structure.

The process may further comprise expanding the first honeycomb ribbon and the second honeycomb ribbon into a honeycomb structure (step 540). Expanding the first honeycomb ribbon and the second honeycomb ribbon may comprise applying a physical force on the first honeycomb ribbon and the second honeycomb ribbon in opposite directions. The physical force may cause the first honeycomb ribbon to separate from the second honeycomb ribbon in regions without the adhesive material. However, the adhesive material may prevent the first honeycomb ribbon from the second honeycomb ribbon in regions containing the adhesive material. This may result in the honeycomb structure as shown in FIG. 3. Additionally, the septum forming material may adhere to both the first honeycomb ribbon and the second honeycomb ribbon, causing the septum forming material to stretch and form a septum cap in a cell of the honeycomb structure.

In various embodiments, the process may comprise curing the septum cap within the cell (step 550). Heat and/or pressure may be applied to the acoustic structure in order to cure the septum cap. Curing the septum cap may add or change the porosity and/or pore size of the septum cap to reach desired properties. Additionally, curing the septum cap may cause the septum cap to stiffen and/or further expand.

Although described primarily with reference to a honeycomb structure, the systems and methods described herein may allow septums to be created in a variety of structures by adhering a septum forming material between two substrates and separating the two substrates such that an acoustic septum is created therebetween.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example A and B, A and C, B and C, or A and B and C. Different cross-hatching is used throughout the figures to denote different parts but not necessarily to denote the same or different materials.

What is claimed is:

1. A method of manufacturing an acoustic structure comprising:
    applying an adhesive to a first honeycomb ribbon;
    applying a septum forming material to the first honeycomb ribbon;
    adhering a second honeycomb ribbon to the adhesive and the septum forming material;
    expanding the first honeycomb ribbon and the second honeycomb ribbon into a honeycomb structure; and
    creating pores in the septum forming material during the expanding.

2. The method of claim 1, wherein the expanding causes the septum forming material to form a septum cap within a cell of the honeycomb structure.

3. The method of claim 2, further comprising curing the septum cap.

4. The method of claim 1, wherein the septum forming material comprises an inherently porous material.

5. The method of claim 1, wherein the septum forming material comprises nanomaterials.

6. The method of claim 1, further comprising compressing the septum forming material between the first honeycomb ribbon and the second honeycomb ribbon prior to the expanding.

7. The method of claim 1, further comprising applying a top sheet and a back skin to the honeycomb structure.

8. The method of claim 1, wherein the septum forming material forms a plurality of septum caps within a cell of the honeycomb structure.

9. The method of claim 1, wherein the septum forming material adheres to the first honeycomb ribbon and the second honeycomb ribbon during the expanding to form a septum cap.

10. A method of manufacturing an acoustic septum comprising:
    adhering a first substrate to a second substrate with a septum forming material;
    separating the first substrate from the second substrate; and
    introducing pores to the septum forming material;
    wherein the septum forming material stretches to form an acoustic septum cap between the first substrate and the second substrate.

11. The method of claim 10, further comprising curing the septum forming material.

12. The method of claim 10, further comprising adhering the first substrate to the second substrate with an adhesive material.

13. The method of claim 12, wherein the separating the first substrate from the second substrate forms honeycomb cells between the first substrate and the second substrate.

* * * * *